3,062,793
AMORPHOUS COPOLYMERS OF HEXAFLUOROPROPYLENE AND TETRAFLUOROETHYLENE AND THEIR PREPARATION
Herbert Sousa Eleuterio, Wilmington, Del., assignor to E. I. du Pont de Nemours and Company, Wilmington, Del., a corporation of Delaware
No Drawing. Filed Dec. 29, 1958, Ser. No. 783,085
8 Claims. (Cl. 260—87.5)

This invention relates to novel normally solid perfluorocarbon interpolymers of hexafluoropropylene and tetrafluoroethylene and their preparation.

Normally solid interpolymers of hexafluoropropylene and tetrafluoroethylene are known, cf. Sauer U.S. Patent 2,549,935 issued April 24, 1951, Miller U.S. Patent 2,598,-283 issued May 27, 1952 and Belgian Patent 560,454 granted September 14, 1957. The normally solid prior art interpolymers of these monomers have, however, been normally crystalline materials, in the sense that after being heated to temperatures on the order of 300° C. and allowed to cool in air to room temperature, they show upon X-ray examination the patterns characteristic of crystalline materials.

It is an object of the present invention to provide new normally solid interpolymers of hexafluoropropylene and tetrafluoroethylene which are normally amorphous in the above-mentioned sense. Yet another object is to provide methods for the preparation of such polymers. Other objects will be apparent hereinafter.

In accordance with the present invention there are provided new normally solid, normally amorphous interpolymers of hexafluoropropylene and tetrafluoroethylene. The novel interpolymers may be prepared by heating a mixture of 70 to 99 weight percent of hexafluoropropylene and 1 to 30 weight percent complementally of tetrafluoroethylene at a temperature in the range of 70 to 350° C. under a pressure of at least 2000 atmospheres, preferably 2000 to 10,000 atmospheres, in the presence of a polymerization initiator.

The invention is more particularly described and explained by means of the following illustrative examples, in which all parts are by weight except as noted.

*Example I*

A stainless steel vessel of 120 parts water capacity was charged with 85 parts of perfluorodimethylcyclobutane, 0.15 part of bis(trifluoromethylthio)mercury, and 2 parts of tetrafluoroethylene. The charge was pressurized with hexafluoropropylene to fill the vessel with liquid at room temperature, and confined and heated at 200° C. for 4 hours. A pressure of about 3000 atmospheres prevailed during the heating period. Upon cooling the charge and flashing off the unreacted monomer and solvent, there was obtained 5 parts of hexafluoropropylene/tetrafluoroethylene interpolymer. A 2 mil thick film molded from the interpolymer at 250° C. and cooled to room temperature was limp, transparent, and completely amorphous as determined by X-ray. The film showed a specific I.R. ratio of about 17. The specific I.R. ratios reported herein are those determined by the procedure of the aforementioned Belgian patent. The intensity of absorption of the film in the infrared at a wave length of 10.18 microns, relative to the intensity of absorption of a similar film of a homopolymer of hexafluoropropylene prepared under the conditions of this example except that no tetrafluoroethylene was charged, was 60%. The polymer was soluble in perfluorodimethylcyclobutane, and manifested an inherent viscosity of 0.2 as measured at 25° C. and 0.5% concentration (grams per 100 ml. of solution) in that solvent, calculated according to the usual equation $$\eta_{inh} = \frac{\ln V\ soln./V\ solv.}{0.5}$$

where $\eta_{inh}$ is inherent viscosity, V soln. is the viscosity of the solution at 25° C., and V solv. is the viscosity of the solvent at 25° C.

In contrast to the foregoing an otherwise similar run in which the tetrafluoroethylene charge was 25 parts yielded an interpolymer having a specific I.R. ratio of 10.5, showing a crystallinity of 15% as determined by comparing the areas under the crystalline and amorphous peaks from X-ray analysis.

*Example II*

The procedure of Example I was repeated except that the amount of tetrafluoroethylene charged was 6 parts and instead of the bis(perfluorodimethylthio)mercury there was charged 0.1 part of cobalt trifluoride. There was obtained 15 parts of interpolymer having a specific I.R. ratio of about 22, and an absorption relative to polyhexafluoropropylene at 10.18 microns of 90%. The interpolymer film was stiff, transparent, and completely amorphous. It was soluble in perfluorodimethylcyclobutane and showed an inherent viscosity of 0.4 as determined at 25° C. and 0.5% concentration in that solvent.

Similar results are obtained in a run similar except that the charge contains 20 parts oxygen per million parts of monomer charged, and no cobalt trifluoride.

In contrast to the foregoing a charge of 0.068 part of bis(trichloroacetyl)peroxide, 32.2 parts of hexafluoropropylene and 3.6 parts of tetrafluoroethylene was charged at low temperature to polymerization vessel of 80 parts water capacity, warmed to —16° C., and maintained at that temperature under autogenous pressure (on the order of 2 atmosphers) until reaction ceased. There was obtained a solid interpolymer of hexafluoropropylene and tetrafluoroethylene which upon being pressed into film at 350° C. and allowed to cool in air to room temperature was brittle and manifested a crystallinity of about 50% as determined by X-ray analysis.

As previously pointed out the polymer preparative process of the present invention requires a pressure of at least 2000 atmospheres. Any higher pressure may be used, but for practical reasons the preferred pressure will be in the range of 2000 to 10,000 atmospheres. The temperature required for reaction will vary to a considerable extent with the nature of the polymerization initiator employed. However, the reaction is extremely slow at temperatures below 70° C., and at temperatures above 350° C. tends to yield charred products. Temperatures in the range of 100 to 300° C. are preferred. The required relative proportions of monomers are in the range previously stated. With lower proportions of hexafluoropropylene as at lower pressures, crystalline polymers are obtained. In general within this range, limp amorphous polymers, showing 50–70% absorption at 10.18 microns relative to polyhexafluoropropylene are obtained with the lower hexafluoropropylene charges, and stiff amorphous polymers showing 70–95% relative absorption are obtained with the higher hexafluoropropylene charges.

The reaction does not take place in the absence of a polymerization initiator. However, any initiator effective to initiate the polymerization of tetrafluoroethylene at the temperatures required may be used. Examples of other operative initiators beside those illustrated above, include peroxides, e.g. diperfluoroisobutyryl peroxide, diperfluorocarbon disulfides, e.g. diperfluoromethyl disulfide, fluorides of variable valence metals e.g. silver and lead, in which the metal has an oxidation potential greater than mercury and is in its highest valency state, and other thermally unstable fluorine-containing compounds, e.g. $(CF_3N)_2$. The reaction is preferably carried out in the presence of normally liquid perfluorocarbon in which the initiator is at least partially soluble. The amount of initiator may vary widely, but is ordinarily in the range of 0.001 to 5% based on the weight of monomers charged, and 0.001 to 1% if resinous products are desired.

The reaction may be carried out with a charge of monomers and initiator alone, but as illustrated is preferably carried out in the presence of an inert solvent or diluent, such as a normally liquid perfluorocarbon. Because the reaction is preferably carried out at elevated temperatures, other adjuvants such as water and organic materials containing hydrogen or halogen other than fluorine which become reactive under the preferred conditions are preferably excluded, if products of high inherent viscosity are desired.

The amorphous interpolymers of the present invention are useful in most of the applications known for perfluorocarbon resins, and have in addition the feature of ready solubility in perfluorocarbon solvents, from which they may be cast into films or protective coatings, or spun into fibers. They may also be fabricated by molding and extrusion techniques at elevated temperatures. In line with their amorphous nature, articles made from the polymer show relatively slow steady changes in physical properties with change in temperature, in contrast to the behavior of crystalline polymers which tend to show sharp changes in physical properties with change in temperature.

I claim:

1. A process for the preparation of normally solid, normally amorphous interpolymers of hexafluoropropylene and tetrafluoroethylene which comprises contacting a mixture of 70 to 99 weight percent hexafluoropropylene and 1 to 30% complementally of tetrafluoroethylene at a temperature of 70 to 350° C. and a pressure of at least 2000 atmospheres with 0.001 to 5% based on the weight of monomers charged of polymerization initiator selected from the group consisting of oxygen, perfluorocarbon peroxides, perfluorocarbon disulfides, perfluorocarbon thiomercury compounds, perfluoronitrogen compounds, and fluorides of variable valence metal in which the metal has an oxidation potential higher than mercury and is in its highest valency state.

2. A process according to claim 1 carried out in the further presence of an inert normally liquid perfluorocarbon.

3. A process according to claim 2 wherein the temperature is 100 to 300° C., and the initiator is selected from the group consisting of bis(perfluorodimethyl)mercury, cobalt trifluoride and oxygen.

4. A process for the preparation of normally solid normally amorphous interpolymers of hexafluoropropylene and tetrafluoroethylene which comprises contacting a mixture of 70 to 99 weight percent hexafluoropropylene and 1 to 30% complementally of tetrafluoroethylene at a temperature of 100 to 300° C. and a pressure of at least 2000 atmospheres in an inert normally liquid perfluorocarbon with 0.001 to 1 percent of cobalt trifluoride based on the weight of monomer charged.

5. Hexafluoropropylene/tetrafluoroethylene interpolymer obtained by the process of claim 1, further characterized in that upon being heated to a temperature on the order of 300° C. and allowed to cool in air to room temperature, said interpolymer is solid, transparent, and completely amorphous as determined by X-ray.

6. Hexafluoropropylene/tetrafluoroethylene interpolymer having an inherent viscosity of at least 0.2 as measured at 0.5 percent concentration in perfluorodimethylcyclobutane at 25° C., having in film form an absorption at 10.18 microns wave length which is 50–95 percent of the absorption at 10.18 microns wave length of a similar film of polyhexafluoropropylene, and further characterized in that upon being heated to a temperature on the order of 300° C. and allowed to cool in air to room temperature, said interpolymer is solid, transparent, and completely amorphous as determined by X-ray.

7. The product of claim 6 in pellicular form.

8. The product of claim 6 having a said inherent viscosity of at least 0.4 and a said absorption of 70–95 percent.

References Cited in the file of this patent

UNITED STATES PATENTS

| | | |
|---|---|---|
| 2,468,664 | Hanford et al. | Apr. 20, 1949 |
| 2,549,935 | Sauer | Apr. 24, 1951 |
| 2,598,283 | Miller | May 27, 1952 |
| 2,844,614 | Krespan | July 22, 1958 |

FOREIGN PATENTS

| | | |
|---|---|---|
| 560,454 | Belgium | Sept. 14, 1957 |